UNITED STATES PATENT OFFICE.

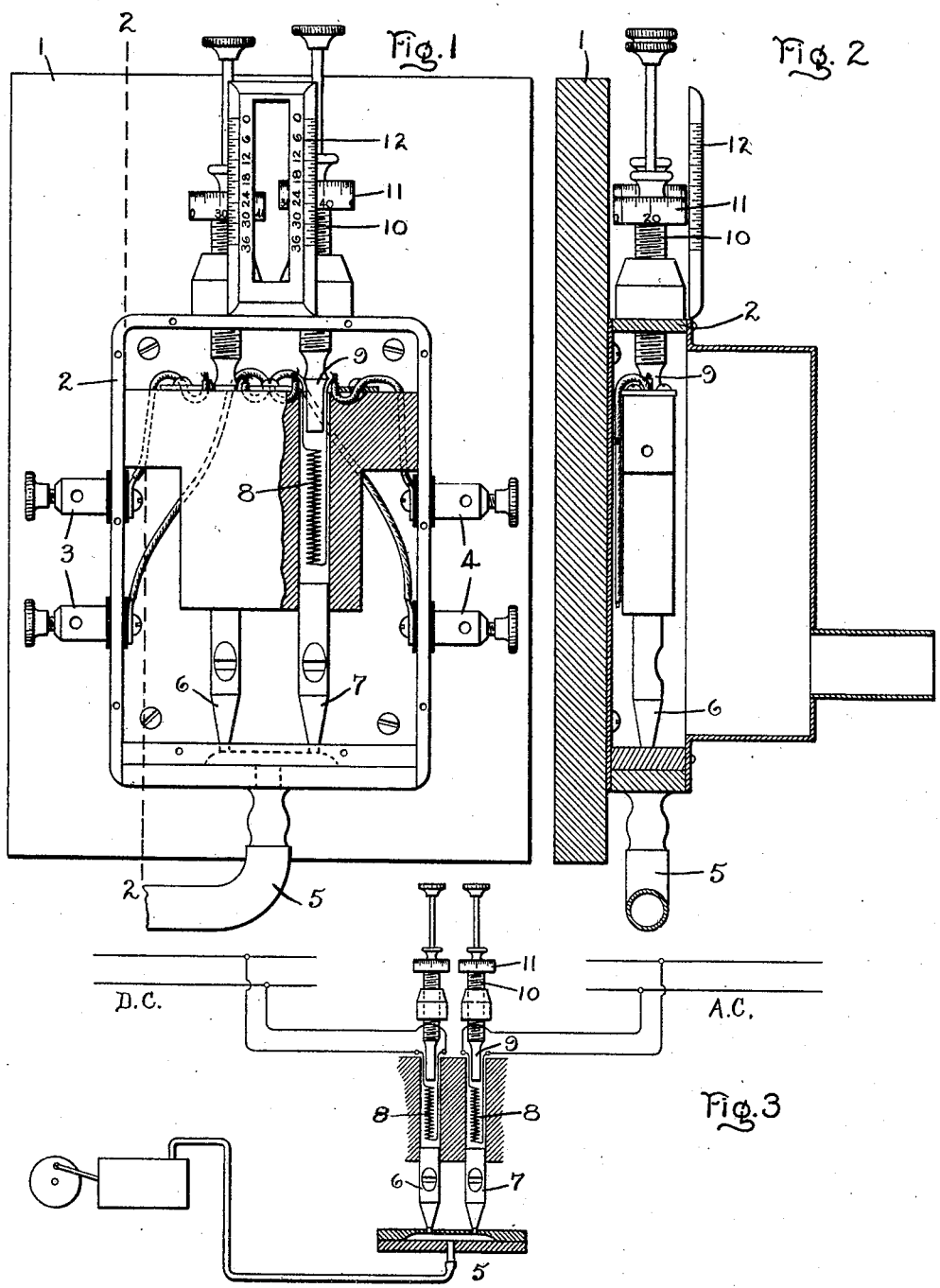

ELIHU THOMSON, OF SWAMPSCOTT, MASSACHUSETTS, ASSIGNOR TO GENERAL ELECTRIC COMPANY, A CORPORATION OF NEW YORK.

MEASURING INSTRUMENT.

No. 925,055.　　　Specification of Letters Patent.　　　Patented June 15, 1909.

Application filed May 11, 1908. Serial No. 432,022.

*To all whom it may concern:*

Be it known that I, ELIHU THOMSON, a citizen of the United States, residing at Swampscott, county of Essex, State of Massachusetts, have invented certain new and useful Improvements in Measuring Instruments, of which the following is a specification.

My invention relates to measuring instruments, particularly electrical measuring instruments of the hot wire type, and its object is to provide a simple and reliable electrical measuring instrument unaffected by magnetic fields or by changes in the wave form of a current and by means of which an alternating current can be measured accurately or can be compared very exactly with a direct current, which in turn can be referred directly to a primary standard and measured more accurately than an alternating current.

In carrying out my invention, a tone varying with the quantity of current to be measured is produced, and the extent of the variation in the tone is measured in any suitable way, preferably by an adjusting means which enables the tone to be varied independently of the current until brought into unison with some standard tone, the extent of this adjustment being a measure of the current flowing through the device. Any suitable device may be used to produce the tone, the preferable form being a pipe, similar to an organ pipe, which is blown by compressed air or other suitable fluid and in which the tone is varied in accordance with the variations in said current by varying the density of the air in the pipe in any suitable way, preferably by means of a heating coil responsive to the current to be measured and mounted in the pipe to heat the air. The variation in the tone of the pipe is preferably measured by means of an adjustable stop in the pipe, which enables the tone of the pipe to be changed independently of the current and to be compared with some standard if desired. Where two different currents are to be compared a device constructed as above described is used for each current, and if the two devices normally sound in unison the amount of adjustment required to make them sound in unison while the two currents are flowing measures the two currents and enables them to be compared very exactly regardless of magnetic fields or of irregularities in the wave form of either current.

My invention will best be understood in connection with the accompanying drawings, which are merely illustrative of one form in which it may be embodied, and in which—

Figure 1 is a plan view partly in section of a device embodying my invention; Fig. 2 is a longitudinal section on the line 2—2 of the device shown in Fig. 1; and Fig. 3 is a diagrammatic view showing the instrument as used for comparing two different currents.

In the specific form of instrument shown in the drawing, the base 1 of any suitable material carries a box 2 having a removable cover and carrying on each side a pair of terminals 3 and 4 by means of which different currents can be introduced into the instrument. The means shown for producing a tone which will vary with the current to be measured, comprises a source of supply 5 for compressed air or other suitable fluid which blows pipes 6 and 7 constructed in the same manner as an organ pipe. The velocity of sound through a column of air in a pipe of this type is very nearly equal to the square root of the air pressure divided by its density, and when the value of this ratio is maintained constant, the pitch of the pipe is also constant. Barometric changes of pressure do not affect the pitch because the density of the air will vary directly with the pressure, but if the temperature of the air is changed the density at any given pressure will vary inversely with the temperature. If the temperature of the air rises the density will fall, the ratio of the pressure and density is no longer constant, the velocity of the sound waves therefore increases and the pitch of the pipe is correspondingly raised. The changes of pitch produced in this way are taken to vary as the square roots of the absolute temperatures, that is 273° plus the temperature above 0° C.

In order to make the pitch of the tone produced by the pipes 6 and 7 dependent on the current to be measured, the density of the air or other fluid in the pipes is caused to vary with the current by means of the heating coils 8 placed in the pipes and connected to the terminals 3 and 4. These heating coils develop heat varying with the current flowing through them and thereby heat the surrounding air in the pipe, changing the density of the air and therefore changing the pitch of the sound emitted by the pipe.

The extent of variation in pitch produced by the current flowing through the heating coil 8 may be measured in any suitable manner, but most conveniently by providing some adjusting means which enables the pitch of the pipe to be altered independently of the heating coil. The adjusting means shown in the drawing comprises a stop 9 for the pipe adjustable to vary the length of the column of air in the pipe and carried upon an adjusting screw 10 mounted in a boss on the box 2 and provided with a micrometer head 11 which coöperates with a scale 12 and permits the position of the stop in the pipe to be determined very accurately. If the pipe is blown and produces a tone of a certain pitch, the passage of a current through the heating coil will alter the pitch and the amount of adjustment of the stop 9 which is required to make the pitch when current is flowing the same as the pitch when no current is flowing is an accurate indication of the amount of current flowing through the coil.

The instrument is calibrated by adjusting the air pressure until the pipes produce a tone that can be clearly heard and the pipes are then made to sound in unison. A current of known value is then passed through the resistance in one of the pipes, heating the air and raising the pitch of that pipe. The plug 9 at the top of the pipe is then lowered into the pipe until the notes of both pipes are again in unison and beats are no longer heard when the position of the micrometer screw is noted. Other points in the calibration are obtained in the same way and a table giving the settings of the micrometer screw for different currents makes it possible to measure any current within the compass of the instrument.

As shown in Fig. 3, it is possible by means of this instrument to compare a direct current with an alternating current, and in using the instrument in this way the pipes are blown in unison without any current passing through the heating coils, after which the two currents to be compared are passed through the heating coils of the respective pipes, thereby changing the pitch of each pipe. The stops in the pipes are adjusted to bring the tones of the two pipes again into unison and the readings are compared.

The length of the pipes and the pitch of the tone employed is immaterial but if a pipe having a length of about $2\frac{1}{4}''$ is used, the pitch of the note will have a frequency of approximately 3000 periods per second. If it is assumed that this frequency is obtained at 20° C. then the frequency at 21° C. bears the same relation to 3000 that the absolute temperature at 21° C. bears to the absolute temperature at 20° C., or in other words the frequency at 21° C. becomes 3005 periods per second and a rise of 1° C. sharpens the pitch in the ratio of 3000 to 3005. The number of beats will be the difference between these two frequencies or five per second.

My invention may be embodied in many other forms than that shown and described, and I therefore do not wish to be restricted to the exact form shown but intend to cover by the appended claims all changes and modifications within the spirit and scope of my invention.

What I claim as new and desire to secure by Letters Patent of the United States, is,—

1. In an electrical measuring instrument, the combination with means for producing a tone, of means responsive to the current to be measured for varying said tone with variations in said current, and means for measuring the variations in said tone.

2. In an electrical measuring instrument, the combination with means for producing a tone, of means responsive to the current to be measured for rendering the pitch of said tone dependent on the current to be measured, and means for measuring the pitch of said tone.

3. In an electrical measuring instrument, the combination with means for producing two tones, of means dependent on the current to be measured for varying one of said tones, and means for varying one of said tones independently of said current.

4. An electrical measuring instrument comprising a current carrying conductor, an elastic medium responsive to changes of temperature of said conductor, and means for indicating the changing vibration rates under such changes of temperature.

5. In a measuring instrument, the combination with means for producing a tone, of means dependent on the quantity to be measured for varying the pitch of said tone, and adjusting means for varying the pitch of said tone independently of said quantity.

6. In a measuring instrument, the combination with means for producing a tone of uniform pitch, of means for producing a second tone, means dependent on the quantity to be measured for varying the pitch of said second tone, and adjusting means for varying the pitch of the second tone independently of said quantity.

7. In a measuring instrument, the combination with means for producing a tone dependent in pitch on the density of a fluid, of means for rendering the density of said fluid dependent on the quantity to be measured.

8. In an electrical measuring instrument, the combination with means for producing a tone dependent in pitch on the density of a fluid, of a heating coil responsive to the current to be measured for varying the density of said fluid.

9. In a measuring instrument, the combination with a pipe and means for sounding said pipe, of means for rendering the density of the air in said pipe dependent on the quantity to be measured.

10. In an electrical measuring instrument, the combination with a pipe and means for sounding said pipe, of a heating coil in said pipe responsive to the current to be measured.

11. In a measuring instrument, the combination with a pipe and means for rendering the pitch of the tone of said pipe dependent on the quantity to be measured, of adjusting means for varying the pitch of said pipe independently of said quantity.

12. In a measuring instrument, the combination with a pipe and means for rendering the pitch of the tone of said pipe dependent on the quantity to be measured, of an adjustable stop in the end of said pipe for varying the pitch of the tone independently of said quantity.

13. In an electrical measuring instrument, the combination with a plurality of devices for producing tones, of means dependent on the current in a circuit for varying the pitch of the tone of each of said devices, means for connecting each device to a circuit, and adjusting means for varying the tone of one of said devices independently of the current.

14. In an electrical measuring instrument, the combination with a plurality of pipes and means for rendering the tone of each pipe dependent on the amount of current supplied to it, of means for connecting each pipe to a circuit, and an adjusting device for varying the pitch of the tone of one of said pipes independently of the current.

In witness whereof, I have hereunto set my hand this eighth day of May, 1908.

ELIHU THOMSON.

Witnesses:
JOHN A. McMANUS, Jr.,
CHARLES A. BARNARD.